(12) United States Patent
Yu et al.

(10) Patent No.: US 8,135,287 B2
(45) Date of Patent: Mar. 13, 2012

(54) 100 GBIT/S OFDM OPTICAL SIGNAL GENERATION

(75) Inventors: Jianjun Yu, Princeton, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 780 days.

(21) Appl. No.: 12/183,381

(22) Filed: Jul. 31, 2008

(65) Prior Publication Data

US 2009/0214210 A1 Aug. 27, 2009

Related U.S. Application Data

(60) Provisional application No. 61/030,346, filed on Feb. 21, 2008.

(51) Int. Cl.
*H04B 10/04* (2006.01)
*H04B 10/12* (2006.01)

(52) U.S. Cl. ........ 398/183; 398/182; 398/186; 398/200; 398/201

(58) Field of Classification Search ........... 398/182–201
See application file for complete search history.

(56) References Cited

U.S. PATENT DOCUMENTS

2002/0030877 A1* 3/2002 Way et al. .................... 359/183
2006/0228118 A1* 10/2006 Schemmann et al. ........ 398/184
* cited by examiner Primary Examiner — Kenneth N Vanderpuye
Assistant Examiner — Daniel Dobson
(74) Attorney, Agent, or Firm — Joseph Kolodka

(57) ABSTRACT

A method includes modulating lightwaves to provide first and second OFDM signal sidebands at a first polarization direction and first and second OFDM signal sidebands at a second polarization direction, and combining sidebands that are oppositely positioned and joined from the first and second OFDM signal sidebands at each polarization direction to provide a polarization multiplexing OFDM signal.

9 Claims, 4 Drawing Sheets

100 GBIT/S OFDM OPTICAL SIGNAL GENERATION

This application claims the benefit of U.S. Provisional Application No. 61/030,346, entitled "Simultaneous Generation of Centralized Lightwaves and Double/Single Sideband Optical Millimeter-Wave Requiring Only Low frequency Local Oscillator Signals for radio-Over-Fiber Systems", filed on Feb. 21, 2008, the contents of which is incorporated by reference herein.

BACKGROUND OF THE INVENTION

Optical networks designed for Ethernet traffic are becoming more important as the dominance of data over voice services increases. Work in both standards committees and research communities have targeted the transport of 100-Gbit/s Ethernet (100 GE) over wide area networks. Orthogonal frequency division multiplexing (OFDM) is a good transmission format for realizing 100 Gbit/s signal transmission. In recent years, a number of different alternatives have OFDM as a promising method to eliminate the need for optical dispersion compensation in long-haul transmission links. Fiber-optic OFDM systems can be realized either with direct detection optical (DDO) or with coherent optical (CO) detection. Recently, several high data rate OFDM transmission experiments have been reported. Up to 52.5 Gbit/s OFDM signal has been generated and transmitted over 4160 km. But due to the limited bandwidth of the analog to digital converter (A/D) and digital to analog converter (D/A), no 100 Gbit/s OFDM signal has been generated.

The diagrams of FIGS. 1 and 2 show the architecture to generate over 50 Gbit/s OFDM signal in a publication, Sander Jansen et al., 16×52.5-Gb/s, 50-GHz spaced, POLMUX-CO-OFDM transmission over 4,160 km of SSMF enabled by MIMO processing, ECOC 2007: PD. 1. 3. The diagram of FIG. 1 is directly from the Sander Jansen et al. publication and can be reviewed for further details beyond what are necessary here.

In the Sander Jansen et al. technique, each modulator structure consists of two single-ended MZM modulators 202 or MZ to modulate each polarization independently. Subsequently the two POLMUX signals are combined using a polarization beam splitter 208 and the even and odd WDM channels are combined with a 50-GHz inter-leaver. The electrical OFDM channel allocation is illustrated in FIG. 1. Two different frequency RF signals 205, 206 are mixed with data 1 and data 2. After the intensity modulator 202, the electrum spectrum is shown in FIG. 1, while the optical spectrum is shown in FIG. 2. Due to the optical carrier suppression, the carrier is suppressed. Then optical filter or inter-leaver (207) is aligned such that the image band of the OFDM signal is rejected. As you can see in FIG. 2, only one sideband is employed. Because both sidebands have the same information, one sideband has to be rejected. In this way, only 50 Gbit/s OFDM can be generated due to the limited bandwidth of an A/D converter.

Accordingly, there is need for a method to generate over 100 Gbit/s OFDM signals with the limited bandwidth for A/D and D/A converter tolerance.

SUMMARY OF THE INVENTION

In accordance with the invention, a method includes modulating lightwaves to provide first and second OFDM signal sidebands at a first polarization direction and first and second OFDM signal sidebands at a second polarization direction, and combining sidebands that are oppositely positioned and joined from the first and second OFDM signal sidebands at each polarization direction to provide a polarization multiplexing OFDM signal.

In another aspect of the invention, an apparatus includes a modulator for varying lightwaves to provide first and second OFDM signal sidebands at a first polarization direction and first and second OFDM signal sidebands at a second polarization direction; and a polarization beam combiner for combining sidebands that are oppositely positioned and joined from the first and second OFDM signal sidebands at each polarization direction to provide a polarization multiplexing OFDM signal.

BRIEF DESCRIPTION OF DRAWINGS

These and other advantages of the invention will be apparent to those of ordinary skill in the art by reference to the following detailed description and the accompanying figures.

DETAILED DESCRIPTION

The invention is directed to a method for generating an over 100 Gbit/s OFDM signal due to both sidebands being employed.

Figure 3:
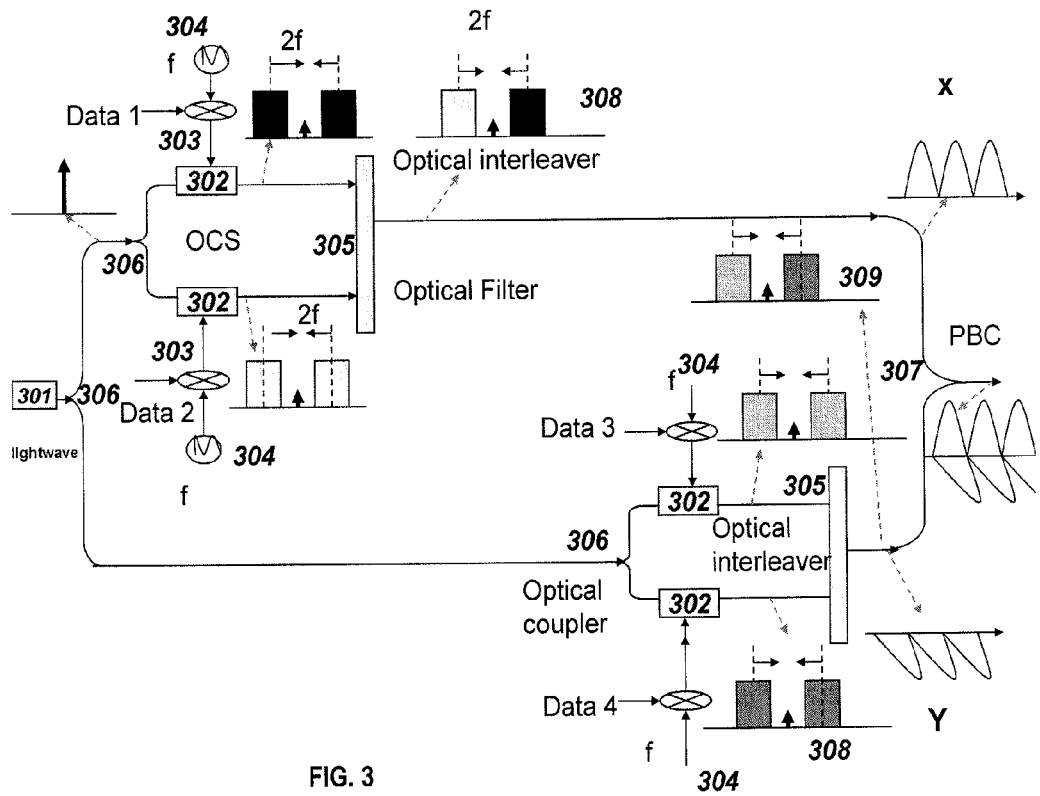
FIG. 3 is a diagram of an exemplary 100 Gbit/s OFDM optical signal generation for transmission in accordance with the invention.
Figure 4:
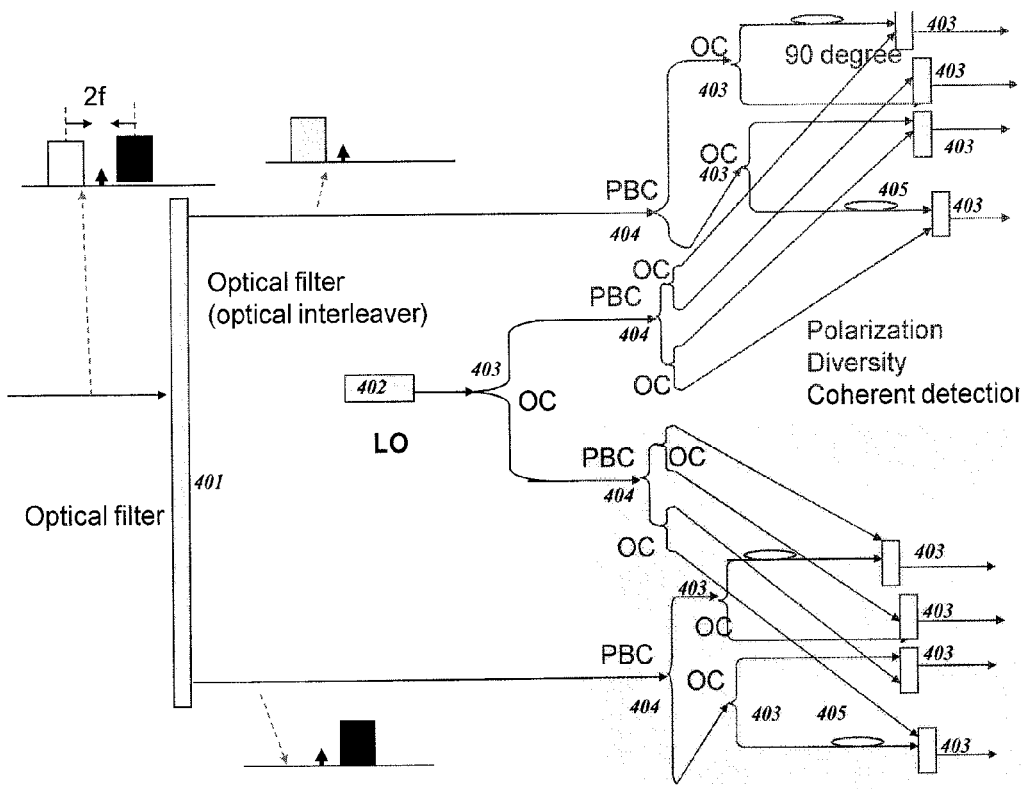
FIG. 4 is a diagram of an exemplary reception of 100 Gbit/s OFDM optical signal generated for transmission in accordance with the invention.
Figure 5:
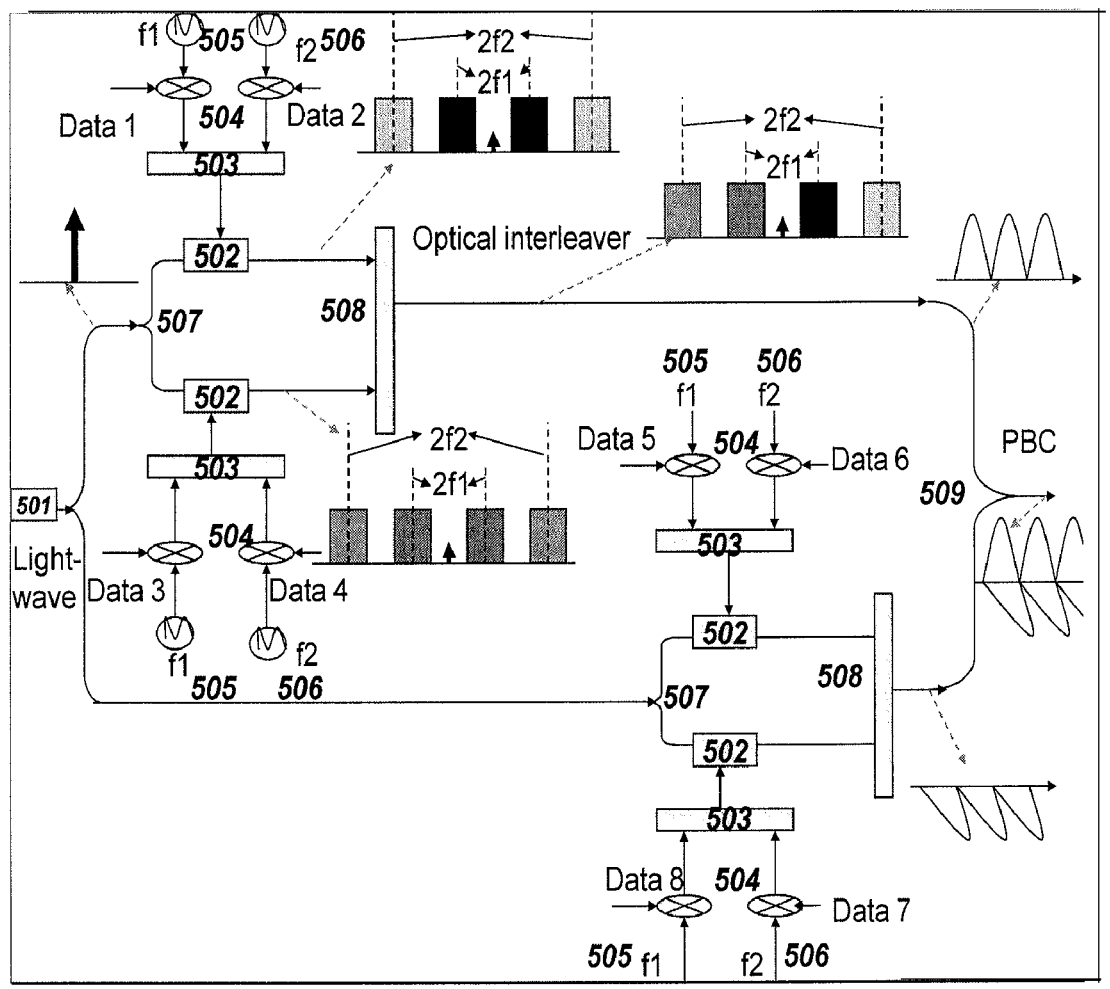
FIG. 5 a diagram of an exemplary 100 Gbit/s OFDM optical signal generation with two RF frequencies for transmission, in accordance with the invention

FIG. 3 is a diagram of an exemplary 100 Gbit/s OFDM optical signal generation for transmission, in accordance with the invention, with only one RF frequency. FIG. 4 is a diagram of an exemplary reception of 100 Gbit/s OFDM optical signal generated for transmission in accordance with the invention. FIG. 5 a diagram of a modification to the configuration of FIG. 3 to show 100 Gbit/s OFDM optical signal generation with two RF frequencies for transmission, in accordance with the invention.

The diagrams of FIGS. 3, 4 and 5 are exemplary configurations using the following optical and electrical components: lightwave source 301, 501, RF frequency 304, 505, 506; electrical mixer 303, 304, 504; optical coupler 306, 507; intensity modulator 302, 502; optical filter 305, 508; and optical polarization beam combiner 307, 509.

The lightwave 301, 501 can be a narrow linewidth laser less than 2 MHz and the intensity modulator generates optical carrier suppression signals. The electrical mixer 303, 304, 504 up-converts the baseband signal to an RF band. The RF signal 304, 505, 506 is provided to the electrical mixer so that the base-band can be up-converted. The optical filter 305, 508 is realized by an optical interleaver so that only a high or low frequency signal can be passed for each port if the interleaver has two ports. Preferably, the interleaver has two input ports and one output port with sharp edge characteristics. The optical coupler 306, 403, 507 are preferably 50% to 50% ratio optical couplers that divide the signal into two equal parts. The optical beam combiner or splitter 307, 404, 509 combines or splits the orthogonal signal. The electrical combiner 503 combines two different frequency RF signals.

Figure 1:
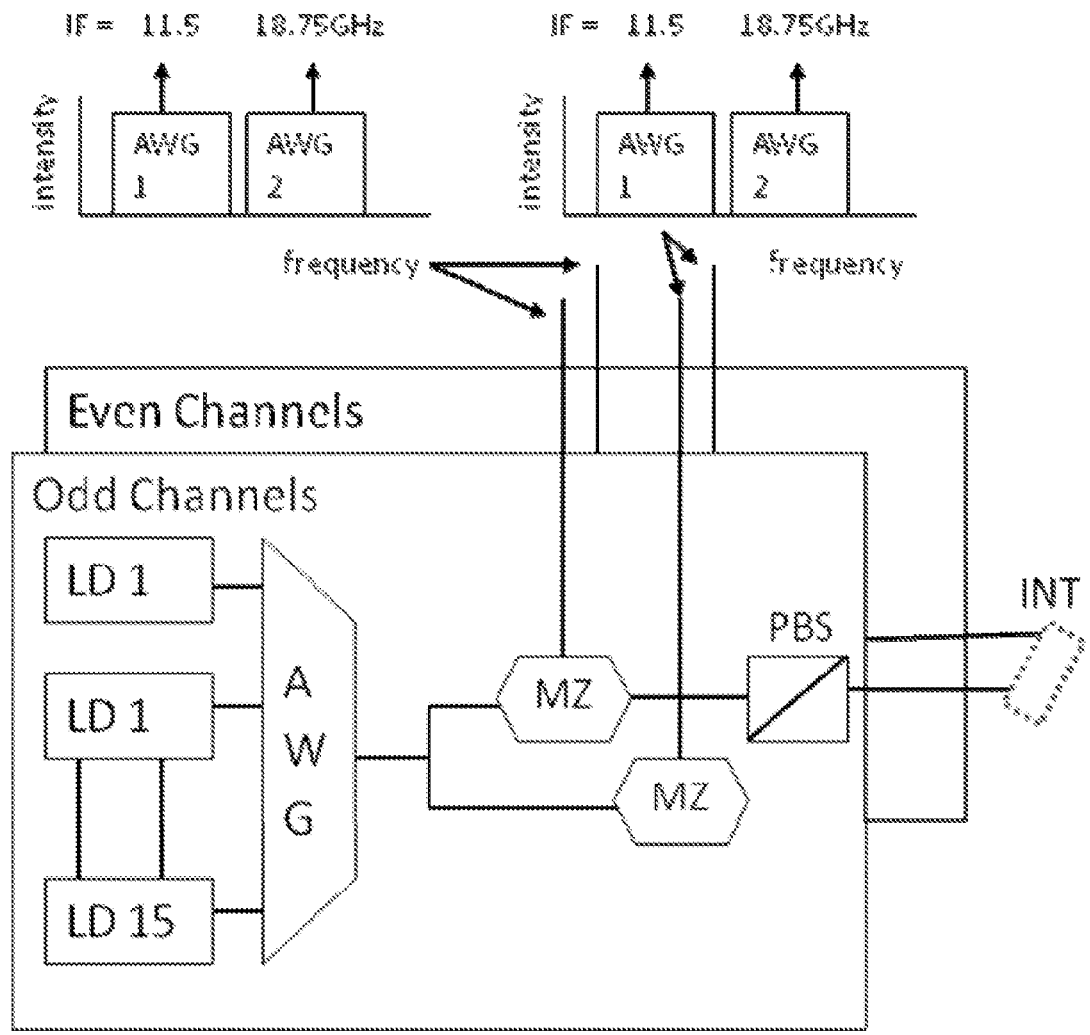
FIGS. 1 and 2 are diagrams illustrating a known technique for generating over 50 Gbit/s in an OFDM signal.
Figure 2:
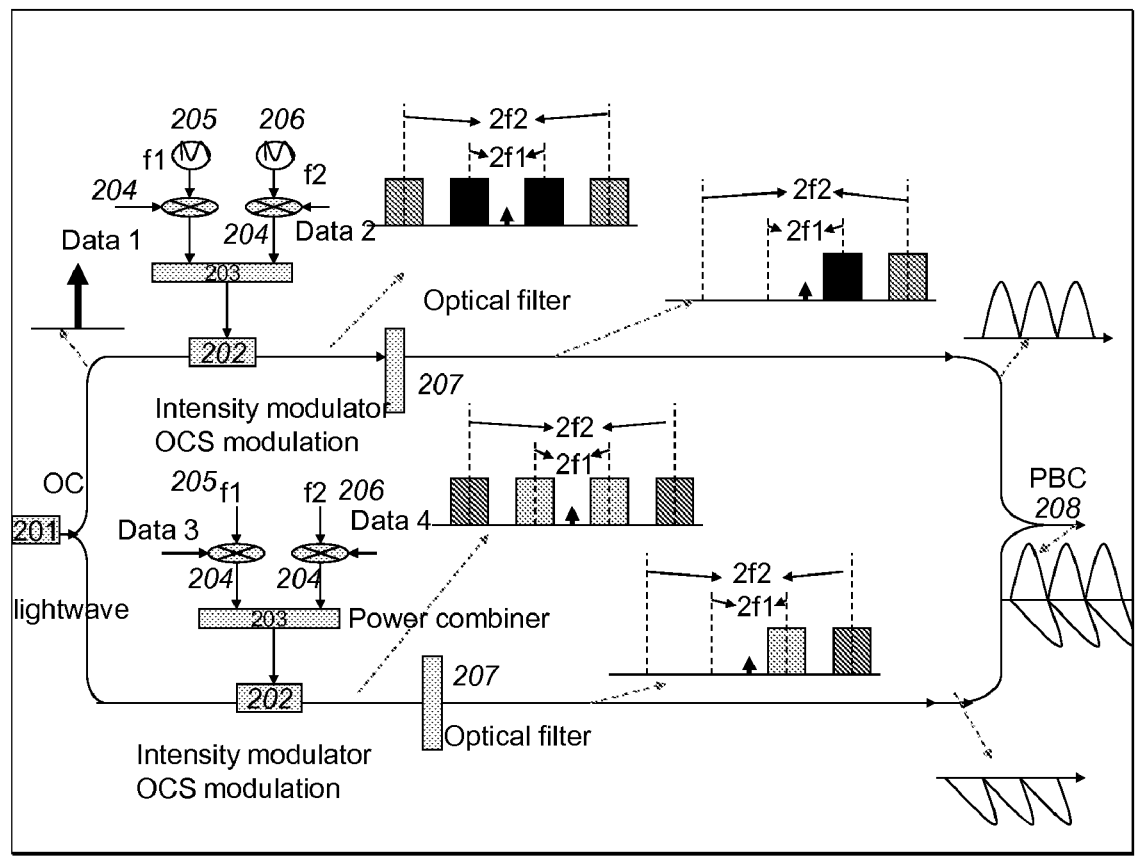

Referring to the diagram of FIG. 3, each intensity modulator 302 is driven by the mixed OFDM signal at RF frequency of f 304 by an electrical mixer 303. The lightwave 301 is split into two parts by an optical coupler 306. Then the two parts will be split again by the same optical coupler 306. There are two polarization directions. We assume that the up-subchannel is X polarization direction and the bottom-one is Y polarization direction. Each modulator 302 is operated at carrier suppression OCS mode. After the modulator, the carrier is suppressed. Then for each polarization direction, we use an optical filter 305, such as an optical inter-leaver to combine the two subchannels. When the interleaver 305 is matched to the wavelength of the input lightwave, we can generate an optical spectrum 308 and 309 as shown in FIG. 3. Each one just passes through half of spectrum (right or left). The optical filter 305 plays a key role tin generating the optical spectrum 308 or 309 and this is the main difference from that technique of FIG. 1 or 2. For example, in this figure with the invention, only right (black) and blue (left) can pass the interleaver. Then both sidebands can be used to carry the optical signals. After combing the X and Y polarization direction subchannels by an optical polarization beam combiner 307, we can generate polarization multiplexing OFDM optical signals.

The diagram of FIG. 4 shows an exemplary receiver configuration for receiving the 100 Gbit/s OFDM signal generated according to FIG. 3. The incoming lightwave is separated into two parts by an optical filter 401, interleaver or other optical filter. Then the right and left side will be detected by a regular 90 degree polarization-diversity coherent detector which includes a local oscillator LO 402 fed through optical couplers 403, 404 to separate coherent detectors 403.

The OFDM signal is generated from the D/A converter. Due to the D/A converter bandwidth limitation, the OFDM signal may not be high enough to carry a signal for over 100 Gbit/s signal (the total capacity with all sub-channels). So we need to change FIG. 3 to FIG. 5 to add one more RF frequency. Here, two RF frequencies, f1 505 and f2 506 are used. They are used to carry the OFDM signal and drive the modulator. The overall architecture is similar to FIG. 3, only one more RF frequency is used. From FIG. 5 we can see that more spectrum components are generated.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, not explicitly shown or described herein, embody the principles of the invention and are within their spirit and scope.

What is claimed is:

1. An apparatus for generating a 100 Gbit/s orthogonal frequency division multiplexed (OFDM) signal, the apparatus comprising:
    a laser that generates an unmodulated optical signal,
    four data sources that generate base-band data streams one through four,
    four electrical mixers that mix the four base-band data streams at a frequency, f, to generate four up-converted data streams,
    at least one optical splitter that splits the unmodulated optical signal into four optical signals,
    a first through fourth optical intensity modulator, each intensity modulator configured to modulate one of the four optical signals with one of the up-converted data streams, thereby generating a carrier suppressed optical signal with at least two sidebands,
    a first optical interleaver configured to combine an upper sideband from the first intensity modulator with a lower sideband from the second intensity modulator to generate a first frequency division multiplexed (FDM) optical signal,
    a second optical interleaver configured to combine an upper sideband from the third optical modulator with a lower sideband from the fourth intensity modulator to generate a second FDM optical signal, and
    a polarization beam combiner (PBC) that combines one polarization of the first FDM optical signal with an orthogonal polarization of the second FDM optical signal, thereby generating a 100 Gbit/s OFDM signal.

2. The apparatus of claim 1, wherein the OFDM signal has a bit rate of at least 100 Gbit/s.

3. The apparatus of claim 1, wherein the sidebands comprise oppositely positioned single sidebands about an RF frequency f.

4. The apparatus of claim 1, wherein the sidebands comprise a first oppositely positioned sideband pair centered about an RF frequency f1 and a second oppositely positioned sideband pair centered about an RF frequency f2, frequency f1.

5. A method for generating a 100 Gbit/s orthogonal frequency division multiplexed (OFDM) signal, the method comprising the steps of:
    generating, responsive to a laser, an unmodulated optical signal,
    generating, responsive to four data sources, base-band data streams one through four,
    mixing, responsive to four electrical mixers, the four base-band data streams at a frequency, f, to generate four up-converted data streams,
    splitting, responsive to at least one optical splitter, the unmodulated optical signal into four optical signals,
    modulating, responsive to a first through fourth optical intensity modulator, one of the four optical signals with one of the up-converted data streams, thereby generating a carrier suppressed optical signal with at least two sidebands,
    combining, responsive to a first optical interleaver, an upper sideband from the first intensity modulator with a lower sideband from the second intensity modulator to generate a first frequency division multiplexed (FDM) optical signal,
    combining, responsive to a second optical interleaver, an upper sideband from the third optical modulator with a lower sideband from the fourth intensity modulator to generate a second FDM optical signal, and
    combining, responsive to a polarization beam combiner (PBC), one polarization of the first FDM optical signal with an orthogonal polarization of the second FDM optical signal, thereby generating a 100 Gbit/s OFDM signal.

6. The method of claim 5, wherein the OFDM signal has a bit rate of at least 100 Gbit/s.

7. The method of claim 5, wherein the sidebands comprise oppositely positioned single sidebands about an RF frequency.

8. The method of claim 5, wherein the sidebands comprise a first oppositely positioned sideband pair centered about an RF frequency f1 and a second oppositely positioned sideband pair centered about an RF frequency f2.

9. The method of claim 5, wherein the sidebands are oppositely positioned and joined by filtering together for each polarization direction a sideband from the first sidebands with an oppositely positioned sideband from the second sidebands.

* * * * *